(12) United States Patent
Bougaev et al.

(10) Patent No.: US 7,861,593 B2
(45) Date of Patent: Jan. 4, 2011

(54) ROTATIONAL VIBRATION MEASUREMENTS IN COMPUTER SYSTEMS

(75) Inventors: Anton A. Bougaev, La Jolla, CA (US); Aleksey M. Urmanov, San Diego, CA (US); David K. McElfresh, San Diego, CA (US); Kenny C. Gross, San Diego, CA (US)

(73) Assignee: Oracle America, Inc., Redwod Shores, CA (US)

( * ) Notice: Subject to any disclaimer, the term of this patent is extended or adjusted under 35 U.S.C. 154(b) by 378 days.

(21) Appl. No.: 12/167,369

(22) Filed: Jul. 3, 2008

(65) Prior Publication Data

US 2010/0004900 A1   Jan. 7, 2010

(51) Int. Cl.
   *G01N 29/00*   (2006.01)
(52) U.S. Cl. .............................. 73/660; 73/593; 73/650
(58) Field of Classification Search .................. 73/660, 73/593, 649, 650, 661, 662
See application file for complete search history.

(56) References Cited

U.S. PATENT DOCUMENTS

| | | | | |
|---|---|---|---|---|
| 6,205,872 | B1* | 3/2001 | Pflueg | 73/866.5 |
| 6,222,336 | B1* | 4/2001 | McKenzie et al. | 318/448 |
| 7,093,492 | B2* | 8/2006 | Treiber et al. | 73/659 |
| 2006/0043254 | A1* | 3/2006 | Wang et al. | 248/550 |
| 2010/0129940 | A1* | 5/2010 | Little | 438/14 |

* cited by examiner

*Primary Examiner*—J M Saint Surin
(74) *Attorney, Agent, or Firm*—Park, Vaughan, Fleming & Dowler LLP; Steven E. Stupp

(57) ABSTRACT

Embodiments of a mechanical device to facilitate in-situ measurements of vibration associated with a corresponding component in a computer system are described. This mechanical device includes a housing that has approximately a same mass as the component, approximately a same distribution of mass about a geometric center of the component, and approximately a same form factor as the component. Moreover, the mechanical device includes one or more vibration sensors, which are mechanically coupled to the housing, and which are configured to perform the in-situ vibration measurements.

20 Claims, 7 Drawing Sheets

┌─────────────────────────────────────────────────────────┐
│ MECHANICALLY COUPLE A MECHANICAL PHANTOM DEVICE IN A SLOT IN A │
│ CHASSIS IN A COMPUTER SYSTEM, WHERE THE MECHANICAL PHANTOM │
│ DEVICE HAS APPROXIMATELY A SAME MASS AS A COMPONENT IN THE │
│ COMPUTER SYSTEM, APPROXIMATELY A SAME DISTRIBUTION OF MASS │
│ ABOUT A GEOMETRIC CENTER OF THE COMPONENT, AND APPROXIMATELY A │
│ SAME FORM FACTOR AS THE COMPONENT, AND EXCLUDES FUNCTIONAL │
│ ELEMENTS OF THE COMPONENT │
│ 510 │
└─────────────────────────────────────────────────────────┘
                              │
                              ▼
┌─────────────────────────────────────────────────────────┐
│ PERFORM IN-SITU VIBRATION MEASUREMENTS IN THE COMPUTER SYSTEM │
│ WITH THE MECHANICAL PHANTOM DEVICE USING ONE OR MORE VIBRATION │
│ SENSORS INTERNAL TO THE MECHANICAL PHANTOM DEVICE │
│ 512 │
└─────────────────────────────────────────────────────────┘

FIG. 5

ROTATIONAL VIBRATION MEASUREMENTS IN COMPUTER SYSTEMS

BACKGROUND

1. Field of the Invention

The present invention relates to devices and techniques for monitoring a computer system. More specifically, the present invention relates to techniques for performing in-situ measurements of rotational vibration in a computer system.

2. Related Art

Rotational vibration (RV) in computer systems, such as servers, can significantly affect reliability. For example, RV can affect the performance of connectors, motors and data storage devices, such as optical drives and hard-disk drives (HDDs). HDDs, in particular, are usually very sensitive to RV, which can cause drastic degradation of input/output-throughput performance. In some cases, such degradation can lead to failure of the entire computer system and, thus, can affect system availability. Consequently, in order to ensure that a computer system continues to operate in the presence of inevitable vibrations, it is important to be able to measure RV.

Unfortunately, when a computer system is fully assembled and powered on, it is often impossible to measure RV non-intrusively, i.e., without altering the mechanical structure of the computer system. This is because the density of components in modern computer systems has increased so that there is often no free space available to accommodate accelerometers to measure RV.

Moreover, removing components to create free space for local RV measurements is typically not a viable solution because such removal can change the measured RV values. For example, while an empty slot may be produced by taking an HDD out of its storage cage (along with the associated mounting brackets and connectors), the mass loading throughout the storage cage will also be changed, which can significantly alter the RV values. In addition, 'global' RV measurements, which may be performed by placing accelerometers on the computer-system case, may only provide information about oscillations of the computer-system case, as opposed to specific components of interest.

Hence, there is a need for other techniques to provide in-situ monitoring of RV in components in a computer system.

SUMMARY

One embodiment of the present invention provides a mechanical device to facilitate in-situ measurements of vibration associated with a corresponding component in a computer system. This mechanical device includes a housing that has approximately a same mass as the component, approximately a same distribution of mass about a geometric center of the component, and approximately a same form factor as the component. Moreover, the mechanical device includes one or more vibration sensors, which are mechanically coupled to the housing, and which are configured to perform the in-situ vibration measurements.

In some embodiments, the vibration includes rotational vibration.

In some embodiments, the mechanical device is configured to mount in the computer system. For example, the mechanical device may be configured to mechanically couple to a chassis in the computer system.

In some embodiments, the one or more vibration sensors include one or more accelerometers, such as one or more linear accelerometers and/or one or more torsional accelerometers.

In some embodiments, the one or more accelerometers include two accelerometers that are configured to measure vibration approximately in a symmetry plane of the mechanical device. Alternatively, the one or more accelerometers may include four accelerometers that are configured to measure vibration approximately in the symmetry plane of the mechanical device and approximately out of the plane.

In some embodiments, at least one of the accelerometers is configured to measure the vibration along a first direction, and the other accelerometers are configured to measure the vibration along at least a second direction. Note that the first direction may be different than the second direction.

In some embodiments, the mechanical device includes an analysis circuit which is configured to average vibration measurements of pairs of the four accelerometers in order to improve an accuracy of the vibration measurements. Alternatively or additionally, the analysis circuit may be configured to compare vibration measurements of pairs of the four accelerometers in order to determine vibration in three dimensions.

In some embodiments, the one or more vibration sensors have a separation from each other which is greater than a pre-determined value. For example, the pre-determined value may correspond to a maximum separation permitted by the housing.

In some embodiments, the component includes a hard-disk drive (HDD).

In some embodiments, the mechanical device includes a communication circuit, where the communication circuit is configured to communicate vibration measurements to a remote location, thereby facilitating remote data collection from the computer system. Moreover, the mechanical device may include a data-logger circuit which is configured to store vibration measurements for subsequent analysis.

Another embodiment provides a computer system that includes a chassis, which has slots, and multiple components mechanically coupled to the chassis, where a given component is mounted in a given slot in the chassis. Moreover, the mechanical device may be mechanically coupled to the chassis in one of the slots.

In some embodiments, the computer system includes a continuous telemetry system which is configured to collect telemetry signals, including the vibration measurements, during operation of the computer system. Moreover, the computer system may include an analysis circuit to analyze the telemetry signals to determine a change in at least one of the components, thereby facilitating remedial action.

Another embodiment provides a method for performing in-situ vibration measurements associated with a component in a computer system. During this method, the mechanical device is mechanically coupled in a slot in the chassis in the computer system, where the mechanical device has approximately a same mass as the component, approximately a same distribution of mass about a geometric center of the component, and approximately a same form factor as the component. Then, the mechanical device performs the in-situ vibration measurements using one or more vibration sensors internal to the mechanical device.

BRIEF DESCRIPTION OF THE FIGURES

FIG. 5 is a flowchart illustrating a process for in-situ RV measurements in a computer system in accordance with an embodiment of the present invention.

Note that like reference numerals refer to corresponding parts throughout the drawings.

DETAILED DESCRIPTION

Figure 1A:
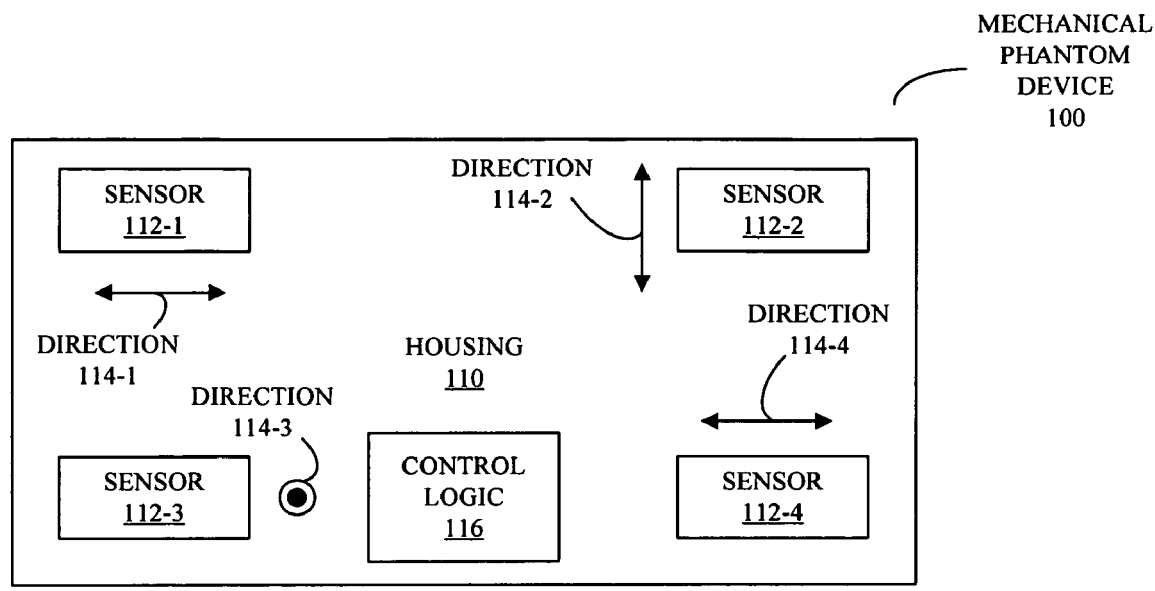
FIG. 1A is a block diagram illustrating a mechanical device in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a device, a system (such as a computer system) that includes the device, and a method are described. These devices, systems and processes may be used to perform in-situ measurements of vibration (such as rotational vibration or RV) in systems. In particular, a mechanical device, which has approximately the same mass, approximately the same mass distribution about a geometric center, and approximately the same form factor as a component (such as a hard-disk drive or HDD), but which lacks one or more functional elements of the component (such as the disks, heads, and/or rotary arm in an HDD), may be mounted in the system. This mechanical device may include one or more vibration sensors, such as accelerometers, which facilitate efficient and accurate measurement of local vibrations in the system without mechanically changing the system (i.e., non-intrusively).

This mechanical device can be used during design of the system. For example, accurate in-situ measurements of RV in fully functional prototypes and systems are very useful during chassis design. These measurements may allow root-cause analysis (such as identifying resonance issues) and assurance of the vibrational reliability of current and future designs.

In some embodiments, the mechanical device can be used to facilitate proactive monitoring of systems. In particular, by performing accurate, local, in-situ RV measurements for one or more components, the quality, reliability, availability, and/or serviceability of these components, as well as the system that includes these components, may be monitored and improved. For example, if a change associated with an impending failure is detected, corrective action can be taken. Therefore, these techniques may reduce operating costs of a wide variety of systems, including: computer systems, servers, laptop computers, personal computers, work stations, mainframe computers, data centers, and/or a portable-computing device.

Note that the term MSET (multivariate state estimation technique) as used in this specification refers to a class of pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington, D.C., Nov. 13-17, 2000. This paper outlines several different pattern-recognition approaches. Hence, the term MSET as used in this specification can refer to (among other things) any technique outlined in [Gribok], including: ordinary least squares (OLS), support vector machines (SVM), artificial neural networks (ANNs), MSET, or regularized MSET (RMSET).

Additionally, note that the system, such as the computer system, may be at one location or may be distributed over multiple, geographically dispersed locations. Consequently, instructions and/or data associated with measurements that are executed by the system may be received and communicated within the system over a network, such as: the Internet or World Wide Web (WWW), an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

While a mechanical device as a substitute for an HDD in a system is used as an illustration in the following discussion, in other embodiments the mechanical device may be used as a substitute for a variety of components in systems, including: one or more digital versatile disc (DVD) drives, one or more optical drives, one or more motors (such as fan motors), and/or any internal mechanical components for which RV measurements are desired.

We now describe embodiments of a device, and a computer system that includes the device, for performing in-situ RV measurements. FIG. 1A presents a block diagram illustrating a mechanical device 100. This mechanical device includes a housing 110 (such as a base casting of an HDD) that has approximately a same mass as a component in a system (such as the HDD), approximately a same distribution of mass about a geometric center of the component, and approximately a same form factor as the component. However, one or more functional elements of the component (such as the disks, heads, and/or rotary arm in an HDD) may be excluded. (This is because it is typically not possible to place sensors, such as vibration sensors 112, directly onto an HDD because of space constraints.) Therefore, mechanical device 100 may provide a mechanical substitute for the component in a system (which does not alter the mechanical structure of the system), but may not have the full functionality of the component.

In order to facilitate in-situ vibration measurements (such as measurements of RV), the mechanical device 100 may include one or more vibration sensors 112, which are mechanically coupled to housing 110. For example, the one or more vibration sensors may include one or more linear accelerometers and/or one or more torsional accelerometers.

In an exemplary embodiment, mechanical device 100 includes four vibration sensors 112. However, in other embodiments mechanical device 100 includes at least two vibration sensors 112, which allows the RV to be determined in a plane, such as a symmetry plane of housing 110 and/or of mechanical device 100.

In some embodiments, vibration sensors 112 determine RV in different directions 114. For example, directions 114 may be in the symmetry plane and approximately out of the plane.

Figure 1B:
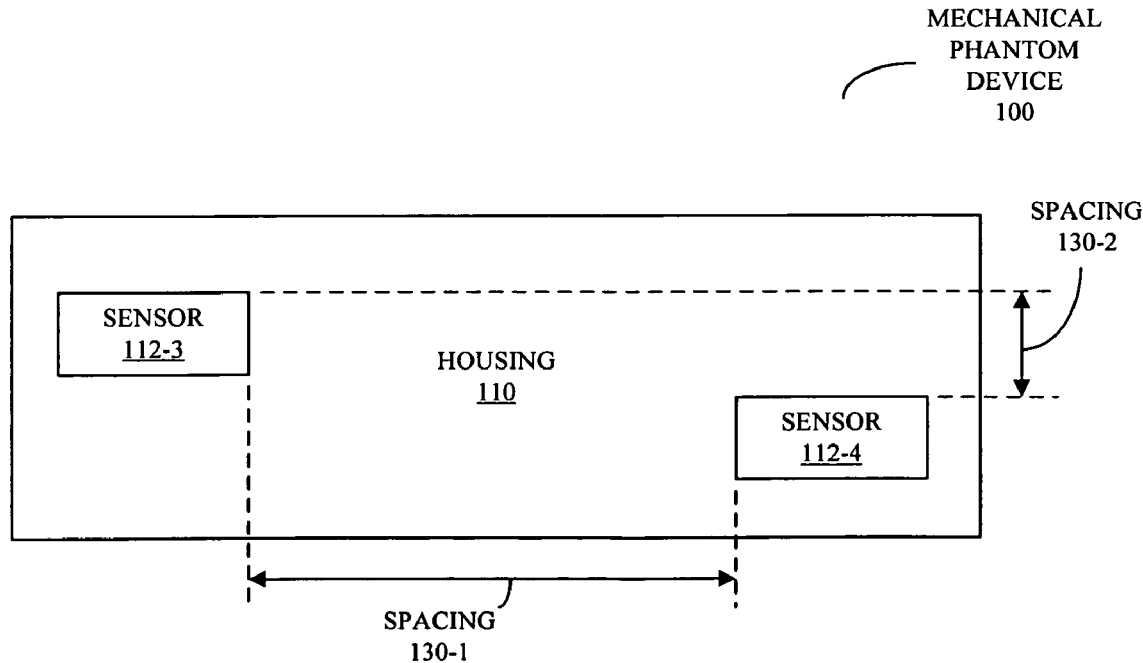
FIG. 1B is a block diagram illustrating a mechanical device in accordance with an embodiment of the present invention.

In some embodiments, vibration sensors 112 are not coplanar. This is shown in FIG. 1B, which presents a block diagram illustrating a side view of mechanical device 100. In particular, pairs of vibration sensors, such as vibration sensors 112-3 and 112-4, may be separated by spacing 130-1 in the symmetry plane and spacing 130-2 out of the plane. If one or more of the vibration sensors 112 are not coplanar, an analysis circuit or module may use the RV measurements to compute vibration about multiple axes. Moreover, RV measurements from pairs of vibration sensors, such as vibration sensors 112-1 and 112-4 (FIG. 1A) may be averaged to improve an accuracy of the RV measurements.

Note that in some embodiments this analysis circuit or module is included in mechanical device 100 (for example, in control logic 116). However, as described further below with reference to FIG. 2, in some embodiments this analysis is performed in a separate device, i.e., outside of mechanical device 100. For example, mechanical device 100 may include a communication circuit (for example, in control logic 116) that communicates RV measurements to a remote location, thereby facilitating remote data collection from the mechanical device 100 and/or a system that includes mechanical device 100 (as described further below with reference to FIGS. 1C and 2). This communication may include: wireless, optical and/or wired communication.

Moreover, mechanical device 100 may include a datalogger circuit (for example, in control logic 116) which, at least temporarily, stores RV measurements for subsequent analysis. This may allow in-situ field studies to be conducted (as opposed to requiring a system to be returned to the manufacturer), and the resulting RV measurements may be subsequently analyzed after the mechanical device 100 is removed from the system. This approach may facilitate rapid and accurate assessments of internal component RV levels at a customer facility.

Note that spacings 130 may be as large as can be accommodated by housing 110. This may improve a resolution of the RV measurements. For example, if the housing has a length×width×height of 6×4×0.75 in$^3$, spacing 130-1 may be approximately 6 in. and spacing 130-2 may be approximately 0.75 in.

Figure 1C:
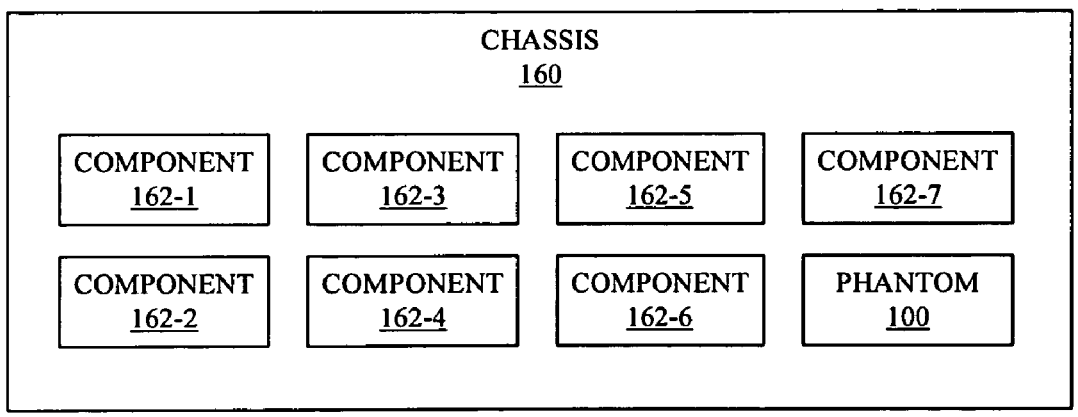
FIG. 1C is a block diagram illustrating a computer system in accordance with an embodiment of the present invention.

As noted previously, mechanical device 100 may be configured to mount in a system. For example, the mechanical device 100 may be configured to mechanically couple to a chassis 160 in a computer system 150, as shown in FIG. 1C. In particular, computer system 150 may include multiple components 162 that are mounted in slots, and mechanical 100 may be included in at least one of these slots, for example, by using mounting brackets.

In some embodiments, computer system 150 includes continuous-telemetry monitoring. This telemetry monitoring may include RV measurements performed using the mechanical device 100 as well as via optional physical sensors. For example, some of these optional physical sensors may be included on a circuit board and/or on one or more integrated circuits, such as one or more processors, in computer system 150. This continuous-telemetry monitoring (which is described further below with reference to FIG. 2) may be used to measure one or more physical variables and/or additional parameters (such as performance metrics) of computer system 150. In some embodiments, the optional physical sensors include thermal sensors (such as thermocouples or ring oscillators), which measure temperature in computer system 150.

Note that in some embodiments mechanical device 100 (FIGS. 1A and 1B) and computer system 150 include fewer or additional components. Moreover, two or more components may be combined into a single component and/or a position of one or more components may be changed.

Figure 2:
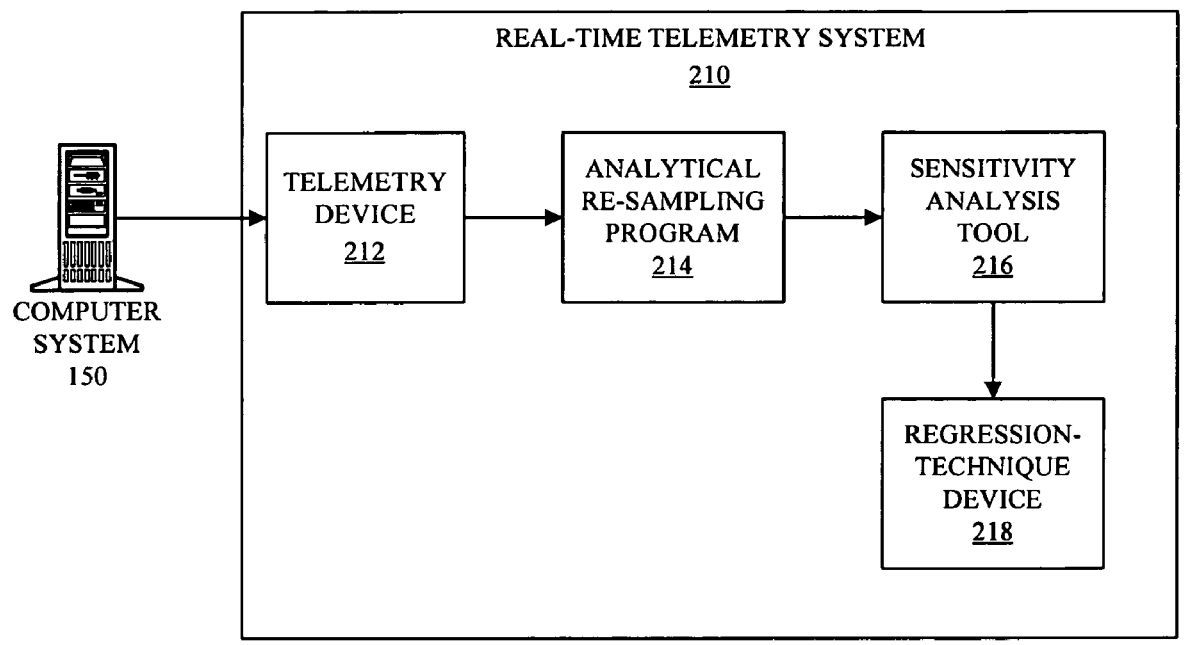
FIG. 2 is a block diagram illustrating a real-time telemetry system in accordance with an embodiment of the present invention.

We now discuss embodiments of a continuous-telemetry-monitoring system. FIG. 2 presents a block diagram of a real-time telemetry system 210 which monitors a computer system 150. This real-time telemetry system includes: telemetry device 212, analytical re-sampling program 214, sensitivity analysis tool 216, and/or regression-technique device 218 (which may use a non-linear, non-parametric (NLNP) regression technique).

Telemetry device 212 may gather information (such as RV measurements, and more generally, telemetry signals) from various sensors and monitoring tools within computer system 150 in real-time during operation of computer system 150. In some embodiments, measurements are performed: as needed, continuously, or when driven by an event (such as an interrupt). Note that the information gathered can include telemetry signals associated with internal performance parameters maintained by software within the computer system 150. For example, these internal performance parameters can include: system throughput, transaction latencies, queue lengths, load on one or more processors or processor cores, load on the memory, load on the cache, I/O traffic, bus saturation metrics, FIFO overflow statistics, and various operational profiles gathered through 'virtual sensors' located within the operating system.

Moreover, the information can include telemetry signals associated with canary performance parameters for synthetic user transactions, which are periodically generated for the purpose of measuring quality of service from the end user's perspective. Additionally, the information may include hardware or physical variables, including, but not limited to: distributed internal temperatures, environmental variables (such as relative humidity, cumulative or differential vibrations within the computer system 150, acceleration, fan speed, acoustic signals, current noise, voltage noise, and/or time-domain reflectometry readings), and/or energy consumption (such as currents and voltages).

Then, real-time telemetry system 210 directs the telemetry signals to local or remote locations that contain analytical re-sampling program 214, sensitivity analysis tool 216, and regression-technique device 218. In some embodiments, analytical re-sampling program 214, sensitivity analysis tool 216, and regression-technique device 218 are located within computer system 150. However, in other embodiments analytical re-sampling program 214, sensitivity analysis tool 216, and/or regression-technique device 218 are located on a plurality of computer systems, including computer system 150 and/or other remote computer systems.

Note that analytical re-sampling program 214 ensures that the telemetry signals have a uniform sampling rate. In doing so, analytical re-sampling program 214 may use interpolation techniques, if necessary, to fill in missing data points, or to equalize the sampling intervals when the raw data is non-uniformly sampled.

After the telemetry signals pass through analytical re-sampling program 214, they may be aligned and correlated by sensitivity analysis tool 216. For example, in some embodiments sensitivity analysis tool 216 uses a moving window technique that 'slides' through the telemetry signals with systematically varying window widths. These sliding windows systematically vary the alignment between windows for different telemetry signals to optimize the degree of association between the telemetry signals, as quantified by an 'F-statistic,' which is computed and ranked for all telemetry signal windows by sensitivity analysis tool 216.

When statistically comparing the quality of two fits, F-statistics reveal the measure of regression. In particular, the higher the value of the F-statistic, the better the correlation between two telemetry signals. In some embodiments, the lead/lag value for the sliding window that results in the F-statistic with the highest value is chosen, and the candidate telemetry signal is aligned to maximize this value. This process may be repeated for each telemetry signal by sensitivity analysis tool 216.

Note that telemetry signals that have an F-statistic very close to 1 are 'completely correlated' and can be discarded. This may occur when two telemetry signals are measuring the same metric, but express them in different engineering units. For example, a telemetry signal can convey a temperature in Fahrenheit, while another telemetry signal may convey the same temperature in Centigrade. Since these two telemetry signals are perfectly correlated, one does not contain any additional information over the other, and therefore, one may be discarded.

Moreover, some telemetry signals may exhibit little correlation, or no correlation whatsoever. In this case, these telemetry signals may be dropped as they add little predictive value. Once a highly correlated subset of the telemetry signals has been determined, they may be combined into one group or cluster for processing by the regression-technique device 218. In particular, as described further below, regression-technique device 218 may determine one or more inferential models based on this subset of the telemetry signals, such as inferential models that associate RV measurements with the proper function of one or more components in the computer system 150 and/or the proper function of the computer system 150. These inferential models may be used to predict reliability and/or degradation of the one or more components in computer system 150, thereby facilitating remedial action prior to a failure or a significant decrease in performance (such as input/output-throughput performance).

Note that the one or more inferential models may be determined during a training (or testing) mode and/or in real time as the telemetry signals are collected. For example, RV measurements may be performed while a sequence of operations (such as a load script) is executed in computer system 150. Then, the RV measurements, as well as other telemetry signals, are received. Next, an inferential model may be determined by performing pattern-recognition analysis on the received signals (in either the time domain and/or the frequency domain) using a regression technique, such as a non-linear, non-parametric regression technique.

In some embodiments, the non-linear, non-parametric regression technique includes a multivariate state estimation technique (MSET). Moreover, in some embodiments changes between a baseline (associated with normal operation) and an impending failure are identified using a sequential detection technique, such as the sequential probability ratio test (SPRT).

In some embodiments, real-time telemetry system 210 includes fewer or additional components. Moreover, two or more components may be combined into a single component and/or a position of one or more components may be changed.

Figure 3:
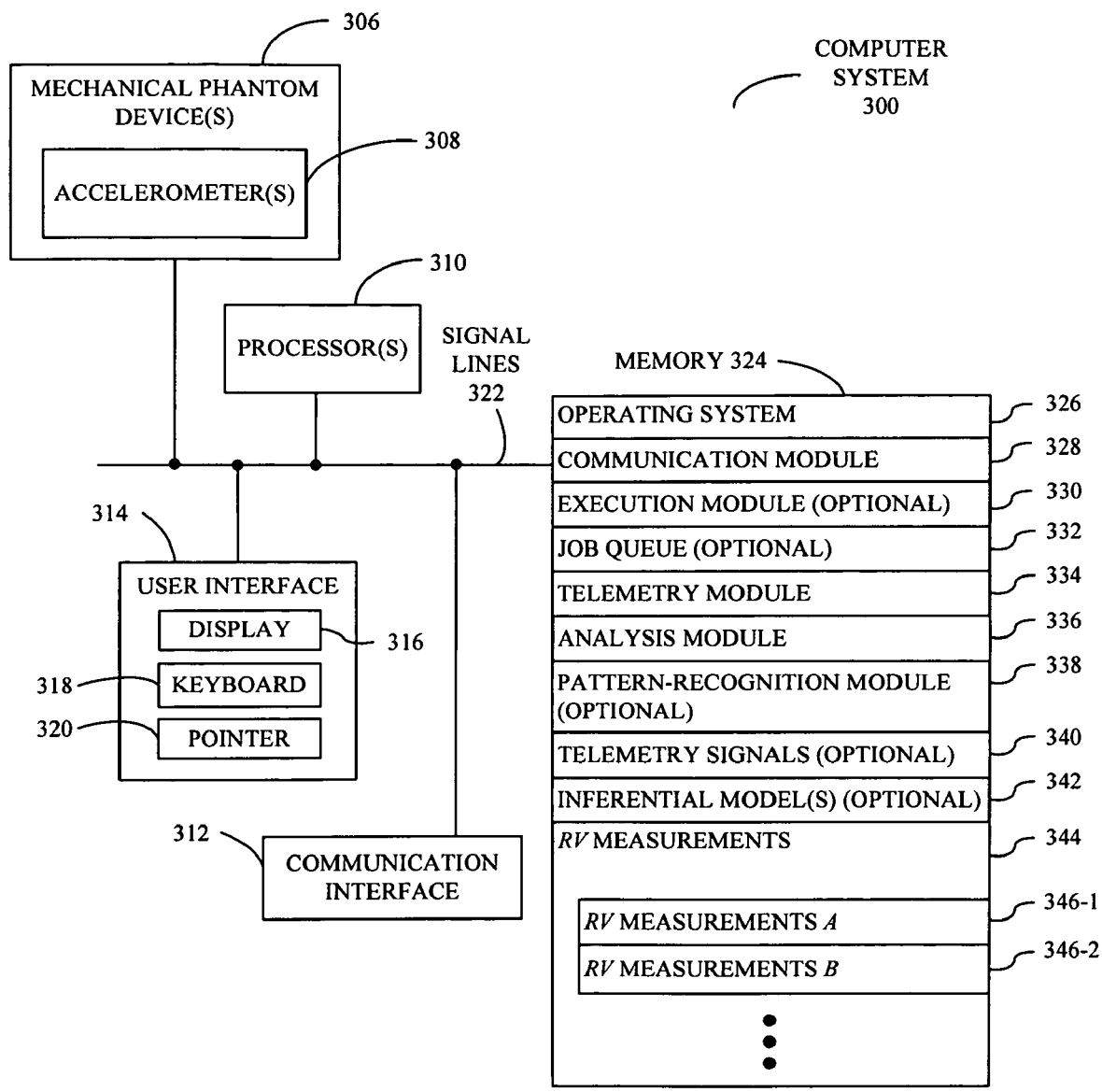
FIG. 3 is a block diagram illustrating a computer system in accordance with an embodiment of the present invention.

FIG. 3 presents a block diagram illustrating a computer system 300, such as the computer system 150 (FIGS. 1C and 2). Computer system 300 includes: one or more mechanical devices 306, one or more accelerometers 308, one or more processors (or processor cores) 310, a communication interface 312, a user interface 314, and one or more signal lines 322 coupling these components together. Note that the one or more processors (or processor cores) 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, flash, one or more smart cards, one or more magnetic disc storage devices, and/or one or more optical storage devices. Memory 324 may store an operating system 326 that includes procedures (or a set of instructions) for handling various basic system services for performing hardware-dependent tasks. Moreover, memory 324 may also store communication procedures (or a set of instructions) in a communication module 328. These communication procedures may be used for communicating with one or more computers, devices and/or servers, including computers, devices and/or servers that are remotely located with respect to the computer system 300.

Memory 324 may also include one or more program modules (or a set of instructions), including: optional execution module 330 (or a set of instructions), telemetry module 334 (or a set of instructions), analysis module 336 (or a set of instructions), and/or optional pattern-recognition module 338 (or a set of instructions). During operation of the computer system 300, telemetry module 334 may perform RV measurements 344, such as RV measurements A 346-1 or RV measurements B 346-2, associated with the one or more accelerometers 308.

In some embodiments, optional execution module 330 performs one or more processes, such as one or more of the jobs in optional job queue 332, either before and/or during the RV measurements 344. In this way, RV measurements associated with a normal operation of computer system 300 may be determined.

After the RV measurements 344 are received, analysis module 336 may analyze the RV measurements 344 to determine a condition associated with one or more components (such as HDDs) in computer system 300, such as proactively detecting degradation anomalies during operation of the one or more components, for example, based on a comparison with the RV measurements associated with normal operation of one or more of computer system 300. For example, analysis module 336 may use a fast Fourier transform (FFT) to convert the RV measurements 344 to the frequency domain, and then may convert the output of the FFT into time-series frequency signals for different frequencies.

Moreover, in some embodiments optional pattern-recognition module 338 performs pattern-recognition analysis on the RV measurements 344 using a non-linear, non-parametric regression technique, such as a multivariate state estimation technique (MSET). This pattern-recognition analysis may determine optional inferential models 342, which may be used in conjunction with the RV measurements 344 to determine the condition. For example, a given inferential model may provide estimates of RV measurements during normal operation of the one or more components, which may allow changes or degradation (such as those associated with an impending failure) to be detected. Note that the optional inferential models 342 may be determined during a training mode (e.g., previously) or during a monitoring mode (e.g., while the condition is being determined or in real time).

In some embodiments, telemetry module 334 receives optional telemetry signals 340 for one or more physical variables which are collected by one or more physical sensors (such as optional physical sensors in computer system 300), which may be disposed on one or more integrated circuits (such as processors 310) in computer system 300. Moreover, optional pattern-recognition module 338 may determine one or more optional inferential models 342 for the one or more physical variables by correlating the RV measurements 344 with the optional telemetry signals 340. The one or more optional inferential models 342 may be used to determine estimated values of the one or more physical variables, such as local temperature values. By comparing the estimated values with recent measurements of the one or more physical variables, analysis module 336 may determine the condition, which in these embodiments may include a change or a failure of one or more of the physical sensors.

Instructions in the various modules in the memory 324 may be implemented in: a high-level procedural language, an object-oriented programming language, and/or in an assembly or machine language. The programming language may be compiled or interpreted, i.e., configurable or configured, to be executed by the one or more processors (or processor cores) 310.

Although the computer system 300 is illustrated as having a number of discrete components, FIG. 3 is intended to be a functional description of the various features that may be present in the computer system 300 rather than a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more application-specific integrated circuits (ASICs) and/or one or more digital signal processors (DSPs).

Computer system 300 may include fewer components or additional components. Moreover, two or more components may be combined into a single component and/or a position of one or more components may be changed. In some embodiments the functionality of computer system 300 may be implemented more in hardware and less in software, or less in hardware and more in software, as is known in the art.

Figure 4:
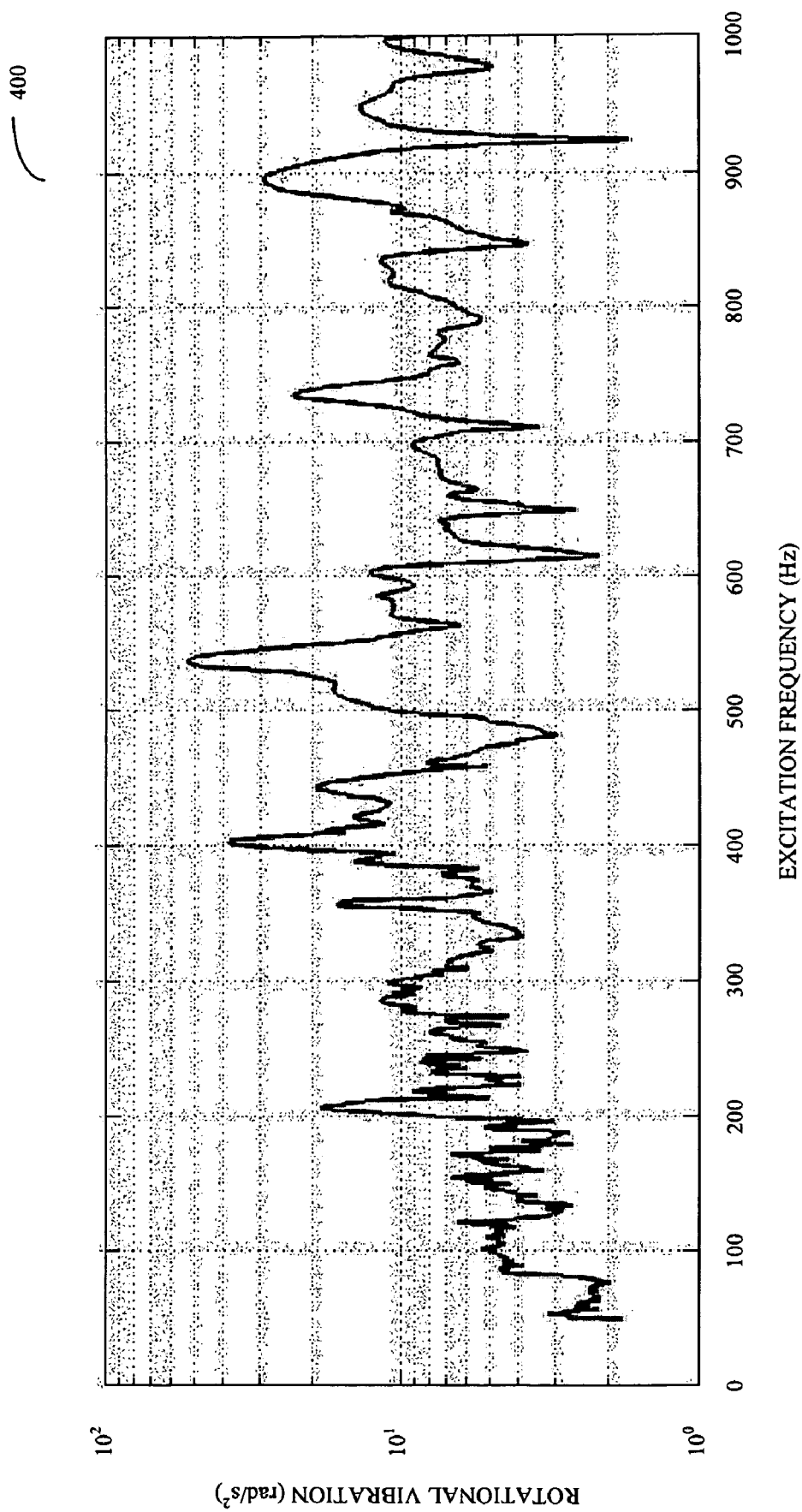
FIG. 4 is a graph illustrating rotational vibration (RV) measurements as a function of excitation frequency during a swept-sine test in accordance with an embodiment of the present invention.

In an exemplary embodiment, a mechanical device includes four accelerometers and is substituted for an HDD in a server. In-situ RV measurement results are shown in FIG. 4, which presents a graph 400 illustrating RV measurements (in units of radians/$s^2$) as a function of excitation frequency (in units of Hz) during a 0.6 g swept-sine test. During this test, an external vibration was applied to the receiving rails of the server in a side-to-side direction. Note the two high RV peaks at approximately 400 and 540 Hz. These peaks demonstrate high RV levels experienced by the HDD in response to the external excitation at those frequencies. In separate measurements of HDD input/output-throughput as a function of excitation frequency during the 0.6 g swept-sine test (not shown), sharp decreases in throughput were observed at the frequencies corresponding to the RV peaks in graph 400, which confirms the accuracy of these in-situ RV measurements.

We now discuss methods for in-situ RV measurements in a computer system. FIG. 5 presents a flowchart illustrating a process 500 for in-situ rotational vibration (RV) measurements in a computer system. During this process, a mechanical device is mechanically coupled in a slot in a chassis in the computer system (510), where the mechanical device has approximately a same mass as the component, approximately a same distribution of mass about a geometric center of the component, and approximately a same form factor as the component, and excludes functional elements of the component. Then, the mechanical device performs the in-situ vibration measurements using one or more vibration sensors internal to the mechanical device (512).

In some embodiments of process 500 there may be additional or fewer operations. Moreover, the order of the operations may be changed and/or two or more operations may be combined into a single operation. Additionally, the preceding operations may be implemented using hardware and/or software, as is known in the art.

Figure 6:
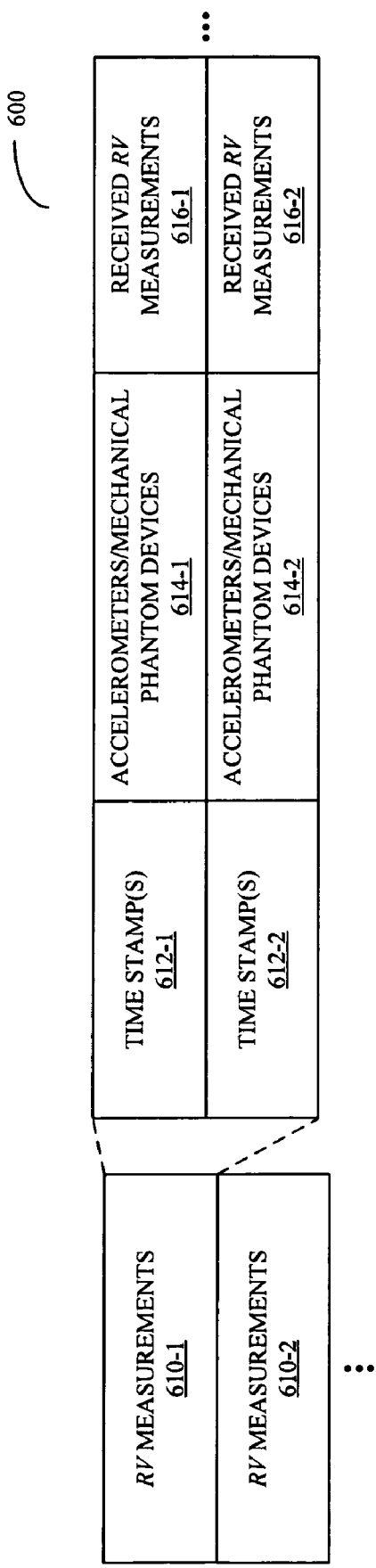
FIG. 6 is a block diagram illustrating an embodiment of a data structure in accordance with an embodiment of the present invention.

We now describe data structures for use in computer system 150 (FIGS. 1C and 2) and 300 (FIG. 3). FIG. 6 presents a block diagram illustrating an embodiment of a data structure 600. This data structure may include RV measurements 610. More specifically, a given instance of the RV measurements 610, such as RV measurements 610-1, may include multiple entries for: one or more time stamp(s) 612, one or more associated accelerometers and/or mechanical devices 614, and/or one or more received RV measurements 616.

Figure 7:
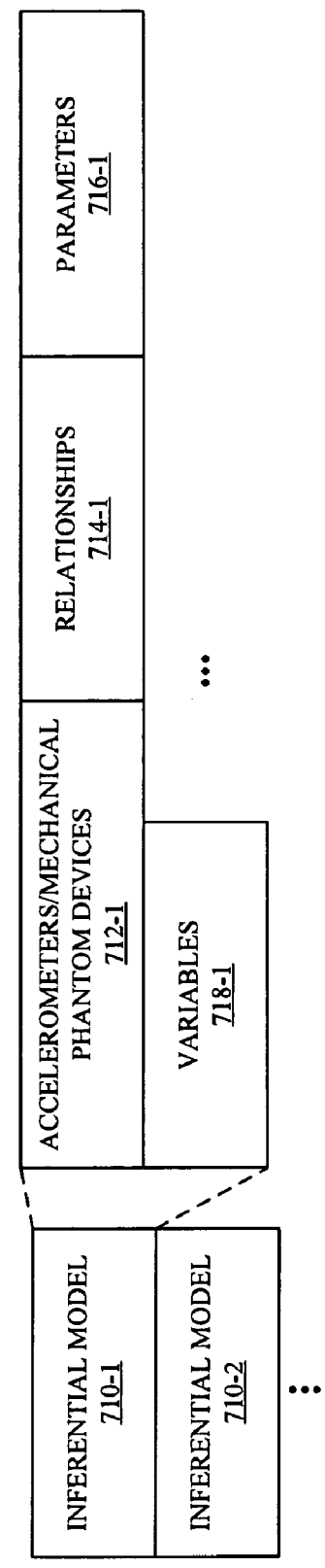
FIG. 7 is a block diagram illustrating an embodiment of a data structure in accordance with an embodiment of the present invention.

FIG. 7 presents a block diagram illustrating an embodiment of a data structure 700. This data structure may include inferential models 710. More specifically, a given instance of the inferential models 710, such as inferential model 710-1, may include: one or more associated accelerometers and/or mechanical devices 712-1 and one or more relationships 714-1 between parameters 716-1 and variables 718-1.

Note that that in some embodiments of the data structures 600 (FIG. 6) and 700 there may be fewer or additional components. Moreover, two or more components may be combined into a single component and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A mechanical device to facilitate in-situ measurements of vibration associated with a corresponding component in a computer system, comprising:

a housing that has approximately a same mass as the component, approximately a same distribution of mass about a geometric center of the component, and approximately a same form factor as the component; and one or more vibration sensors, mechanically coupled to the housing, configured to perform the in-situ vibration measurements.

2. The mechanical device of claim 1, wherein the vibration includes rotational vibration.

3. The mechanical device of claim 1, wherein the mechanical device is configured to mount in the computer system.

4. The mechanical device of claim 1, wherein the mechanical device is configured to mechanically couple to a chassis in the computer system.

5. The mechanical device of claim 1, wherein the one or more vibration sensors include one or more accelerometers.

6. The mechanical device of claim 5, wherein the one or more accelerometers include one or more linear accelerometers.

7. The mechanical device of claim 5, wherein the one or more accelerometers include one or more torsional accelerometers.

8. The mechanical device of claim 5, wherein the one or more accelerometers include two accelerometers configured to measure vibration approximately in a symmetry plane of the mechanical device.

9. The mechanical device of claim 5, wherein the one or more accelerometers include four accelerometers configured to measure vibration approximately in a symmetry plane of the mechanical device and approximately out of the plane.

10. The mechanical device of claim 9, wherein at least one of the accelerometers is configured to measure the vibration along a first direction,
wherein the other accelerometers are configured to measure the vibration along at least a second direction; and
wherein the first direction is different than the second direction.

11. The mechanical device of claim 9, further comprising an analysis circuit which is configured to average vibration measurements of pairs of the four accelerometers.

12. The mechanical device of claim 9, further comprising an analysis circuit which is configured to compare vibration measurements of pairs of the four accelerometers in order to determine vibration in three dimensions.

13. The mechanical device of claim 1, wherein the one or more vibration sensors have a separation from each other which is greater than a pre-determined value.

14. The mechanical device of claim 13, wherein the pre-determined value corresponds to a maximum separation permitted by the housing.

15. The mechanical device of claim 1, wherein the component includes a hard-disk drive (HDD).

16. The mechanical device of claim 1, further comprising a communication circuit, wherein the communication circuit is configured to communicate vibration measurements to a remote location, thereby facilitating remote data collection from the computer system.

17. The mechanical device of claim 1, further comprising a data-logger circuit configured to store vibration measurements for subsequent analysis.

18. A computer system, comprising:
a chassis including slots;
multiple components mechanically coupled to the chassis, wherein a given component is mounted in a given slot in the chassis; and
a mechanical device mechanically coupled to the chassis, wherein the mechanical device is mounted in one of the slots, and wherein the mechanical device includes:
a housing that has approximately a same mass as the component, approximately a same distribution of mass about a geometric center of the component, and approximately a same form factor as the component, wherein the mechanical device excludes functional elements of the component; and
one or more vibration sensors, mechanically coupled to the housing, configured to perform in-situ vibration measurements in the computer system.

19. The computer system of claim 18, further comprising a continuous telemetry system configured to collect telemetry signals, including the vibration measurements, during operation of the computer system; and
an analysis circuit to analyze the telemetry signals to determine a change in at least one of the components, thereby facilitating remedial action.

20. A method for performing in-situ vibration measurements associated with a component in a computer system, comprising:
mechanically coupling a mechanical device in a slot in a chassis in the computer system, wherein the mechanical device has approximately a same mass as the component, approximately a same distribution of mass about a geometric center of the component, and approximately a same form factor as the component; and
performing the in-situ vibration measurements using one or more vibration sensors internal to the mechanical device.

* * * * *